United States Patent … US 7,586,269 B2
Ger et al. … Sep. 8, 2009

(54) DEVICE FOR DRIVING LIGHT SOURCE MODULE

(75) Inventors: Chih-Chan Ger, Shenzhen (CN); Ko-Wen Wang, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,727

(22) Filed: Sep. 15, 2006

(65) Prior Publication Data
US 2007/0247083 A1 Oct. 25, 2007

(30) Foreign Application Priority Data
Apr. 21, 2006 (TW) ................. 95114444 A

(51) Int. Cl.
H05B 41/16 (2006.01)
(52) U.S. Cl. ............. 315/276; 315/224; 315/274; 315/291
(58) Field of Classification Search ............. 315/209 R, 315/224–226, 246–247, 276, 291, 307–308, 315/312, 274, 294
See application file for complete search history.

(56) References Cited

U.S. PATENT DOCUMENTS

| 5,495,405 | A | | 2/1996 | Fujimura et al. | |
|---|---|---|---|---|---|
| 5,798,616 | A | * | 8/1998 | Takehara et al. | 315/247 |
| 6,459,216 | B1 | * | 10/2002 | Tsai | 315/294 |
| 6,784,622 | B2 | * | 8/2004 | Newman et al. | 315/219 |
| 6,812,916 | B2 | | 11/2004 | Hwang | |
| 7,002,819 | B1 | * | 2/2006 | Chan et al. | 363/132 |
| 7,052,171 | B1 | * | 5/2006 | Lefebvre et al. | 362/649 |
| 2003/0107332 | A1 | * | 6/2003 | Newman et al. | 315/307 |
| 2005/0088115 | A1 | * | 4/2005 | Kimura et al. | 315/291 |
| 2005/0105305 | A1 | * | 5/2005 | Sawada et al. | 363/34 |
| 2005/0218827 | A1 | * | 10/2005 | Ushijima et al. | 315/224 |
| 2006/0017399 | A1 | * | 1/2006 | Matsushima et al. | 315/274 |
| 2007/0024205 | A1 | * | 2/2007 | Suzuki | 315/209 R |
| 2007/0114952 | A1 | * | 5/2007 | Yang | 315/307 |
| 2007/0126372 | A1 | * | 6/2007 | Huang et al. | 315/291 |

FOREIGN PATENT DOCUMENTS

CN 1179077 A 4/1998

* cited by examiner

Primary Examiner—David Hung Vu
Assistant Examiner—Tung X Le
(74) Attorney, Agent, or Firm—Wei Te Chung

(57) ABSTRACT

A driving device for driving a lamp (L2) includes a power stage circuit (21), a transformer circuit (22), a resonance circuit (23) and a PWM controller (25). The power stage circuit converts a received direct current (DC) signal to an alternating current (AC) signal. The transformer circuit is connected to the power stage circuit, for stepping up the AC signal. The transformer circuit includes a transformer and a capacitor. The transformer has a primary winding and a secondary winding. The capacitor is connected between a high voltage terminal and a low voltage terminal of the secondary winding of the transformer. The PWM controller is connected to the power stage circuit, for controlling output of the power stage circuit.

15 Claims, 3 Drawing Sheets

DEVICE FOR DRIVING LIGHT SOURCE MODULE

FIELD OF THE INVENTION

The invention relates to electronic driving devices, and particularly to a driving device for driving discharge lamps in a light source module of a liquid crystal display (LCD) panel.

DESCRIPTION OF RELATED ART

Conventionally, discharge lamps such as cold cathode fluorescent lights (CCFLs) have been used as light sources for displays like liquid crystal display (LCD) panels, and must be driven by high voltages. In order to ensure normal operation of the discharge lamps and maintain current at a certain value, there is a need to provide feedback signal of the current flowing through the discharge lamps.

FIG. 3 is a conventional driving device for driving a lamp L1. The conventional driving device includes a power stage circuit 11, a transformer circuit 12, a resonance circuit 13, a feedback circuit 14, and a PWM controller 15.

The transformer circuit 12 includes a transformer T1 and a capacitor C11. The capacitor C11 is connected between a high voltage terminal of a secondary winding of the transformer T1 and ground. The resonance circuit 13 includes a resonance inductor L11, a plurality of resonance capacitors C12 and C13. The resonance capacitors C12 and C13 are arranged in series, and connected between the high voltage terminal of the secondary winding of the transformer T1 and ground. The inductor L11 is connected between the high voltage terminal of the secondary winding of the transformer T1 and the resonance capacitor C12.

In the conventional driving device, there is stray current between the driving device and shell of an LCD panel (seen as a reference ground). Therefore, the feedback signal not only includes current flowing through the lamp L1, but also includes the stray current. However, most of the stray current is generated by the capacitors C11, C12, and C13, which seriously influences precision of the feedback signal.

SUMMARY OF THE INVENTION

An exemplary embodiment of the invention provides a driving device for driving at least one lamp. The driving device includes a power stage circuit, a transformer circuit, a resonance circuit, and a PWM controller. The power stage circuit converts a received direct current (DC) signal to an alternating current (AC) signal. The transformer circuit is connected to the power stage circuit, for stepping up the AC signal. The transformer circuit includes a transformer and a capacitor. The transformer has a primary winding and a secondary winding. The capacitor is connected between a high voltage terminal and a low voltage terminal of the secondary winding of the transformer. The resonance circuit is connected between the high voltage terminal and the low voltage terminal of the secondary winding of the transformer, for converting the stepped up AC signal to an appropriate signal to drive the at least one lamp. The PWM controller is connected to the power stage circuit, for controlling output of the power stage circuit.

Other advantages and novel features will become more apparent from the following detailed description of preferred embodiments when taken in conjunction with the accompanying drawings, in which:

DETAILED DESCRIPTION OF THE INVENTION

Figure 1:
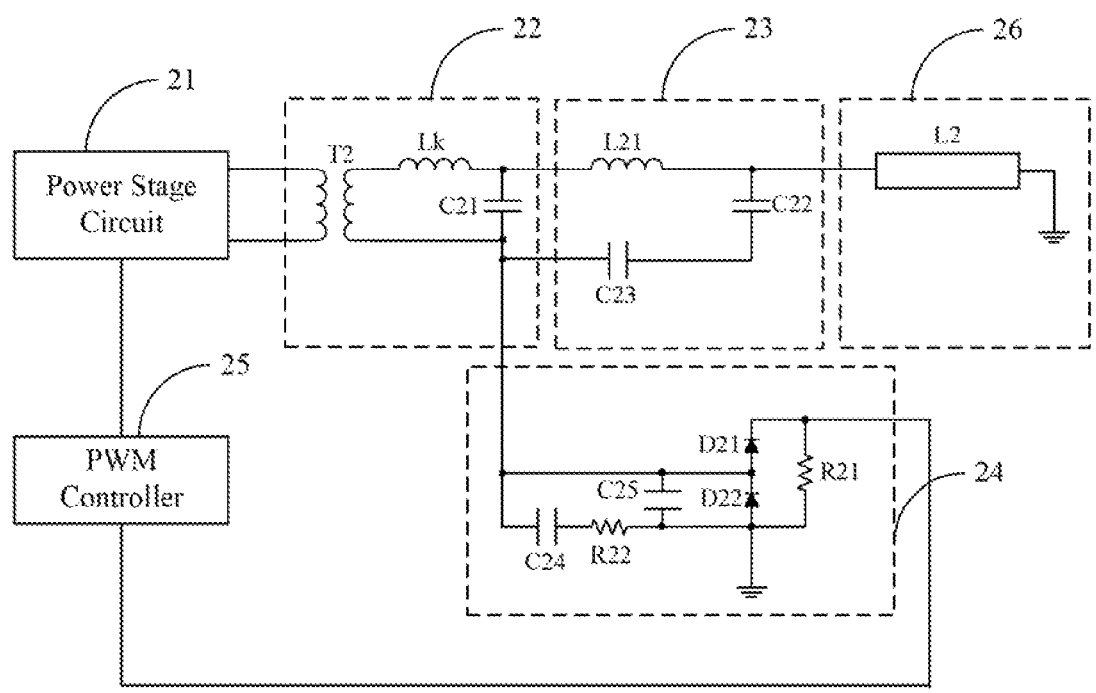
FIG. 1 is a driving device of an exemplary embodiment of the present invention.

FIG. 1 is driving device of an exemplary embodiment of the present invention. The driving device for driving a lamp L2 of a display includes a power stage circuit 21, a transformer circuit 22, a resonance circuit 23, a current balancing circuit or feedback circuit 24, and a PWM controller 25.

The power stage circuit 21 converts a received direct current (DC) power signal to an alternating current (AC) signal. In the exemplary embodiment, the AC signal is a square-wave signal.

The transformer circuit 22 is connected to the power stage circuit 21, and steps up the AC signal. The transformer circuit 22 includes a transformer T2 and a capacitor C21. The transformer T2 has a primary winding and a secondary winding. The capacitor C21 is connected between a high voltage terminal and a low voltage terminal of the secondary winding of the transformer T2, which has a resonance function with a leakage inductor Lk of the transformer T2.

The resonance circuit 23 is connected to the transformer circuit 22, between the high voltage terminal and the low voltage terminal of the transformer T2, for converting the stepped up AC signal to an appropriate signal to drive the lamp L2. In the exemplary embodiment, the signal to drive the lamp L2 is a sine-wave signal.

The resonance circuit 23 includes an inductor L21 and a resonance capacitor C22. The inductor L21 is electrically connected between the high voltage terminal of the secondary winding of the transformer T2 and the lamp L2. The resonance capacitor C22 is electrically connected between the lamp L2 and the low voltage terminal of the secondary winding of the transformer T2. In the exemplary embodiment, the resonance capacitor C22 is an embedded capacitor, which is formed by different layers of copper of a circuit board.

In the exemplary embodiment, the resonance circuit 23 further comprises another resonance capacitor C23 that is electrically connected between the resonance capacitor C22 and the low voltage terminal of the secondary winding of the transformer T2.

The feedback circuit 24 is connected to the transformer circuit 22, for providing a feedback signal of current flowing through the lamp L2. The feedback circuit 24 includes a filter circuit that includes a filter capacitor C25. The filter capacitor C25 is connected between the low voltage terminal of the secondary winding of the transformer T2 and ground, for filtering noise of the feedback signal.

In the exemplary embodiment, the feedback circuit 24 includes another filter circuit that includes a filter capacitor C24 and a resistor R22. The filter capacitor C24 and the resistor R22 are arranged in series, and connected between the low voltage terminal of the secondary winding of the transformer T2 and ground, also for filtering noise of the feedback signal. In the exemplary embodiment, the filter circuits are used for filtering noise of different frequencies of the feedback signal, and ensure a precise feedback signal.

The feedback circuit 24 includes a resistor R21 and a plurality of diodes D21 and D22. An anode of the diode D22 is grounded, and a cathode of the diode D22 is connected the low voltage terminal of the secondary winding of the transformer T1. An anode of the diode D21 is connected to the cathode of the diode D22, and the resistor R21 is connected between a cathode of the diode D21 and ground, for providing a voltage signal indicating current flowing through the lamp L2.

The PWM controller 25 is connected between the feedback circuit 24 and the power stage circuit 21, between the cathode of the diode D21 and the power stage circuit 21, for controlling output of the power stage circuit 21 according to the feedback signal.

Figure 2:
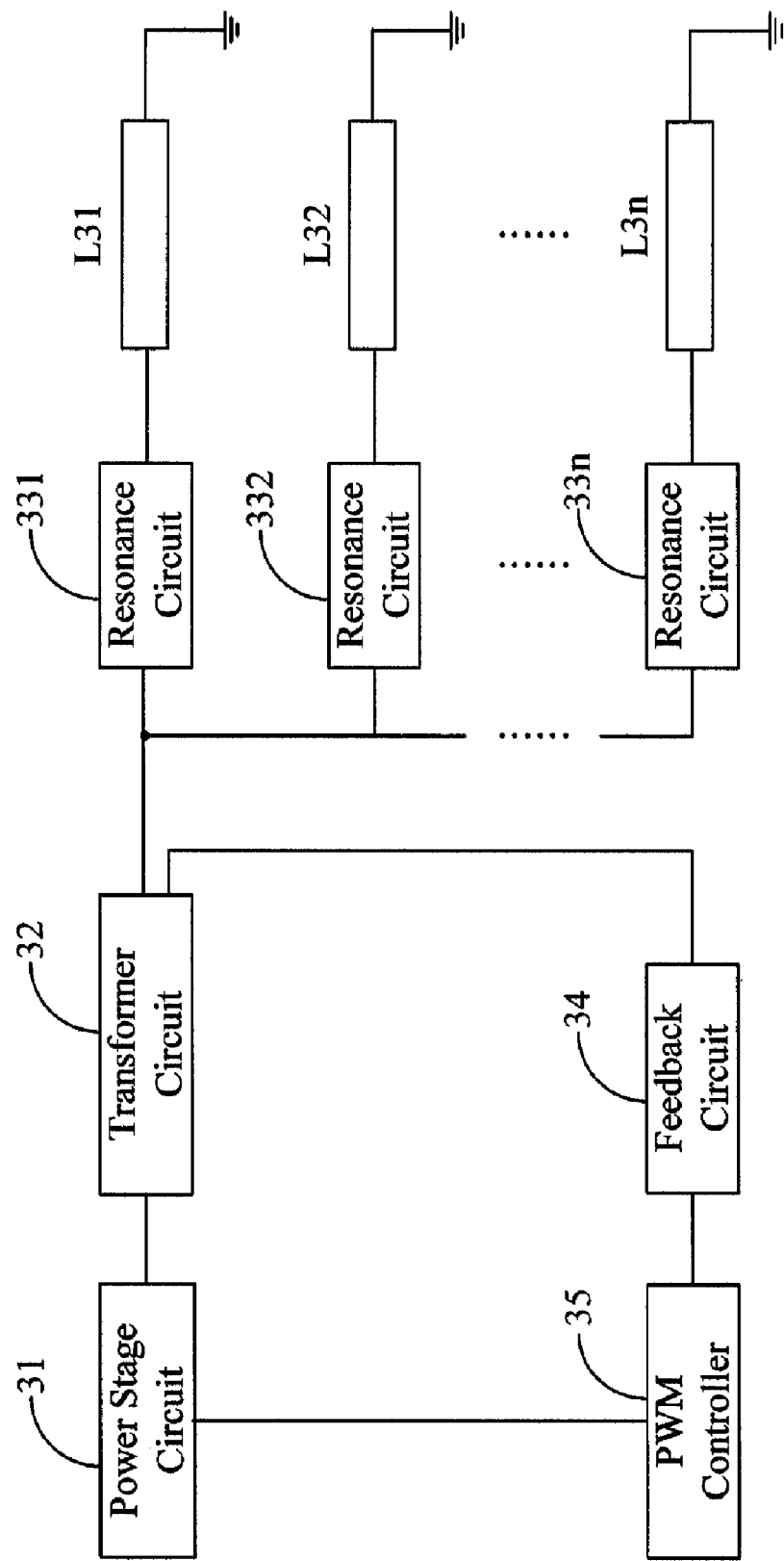
FIG. 2 is a driving device of another exemplary embodiment of the present invention.
Figure 3:
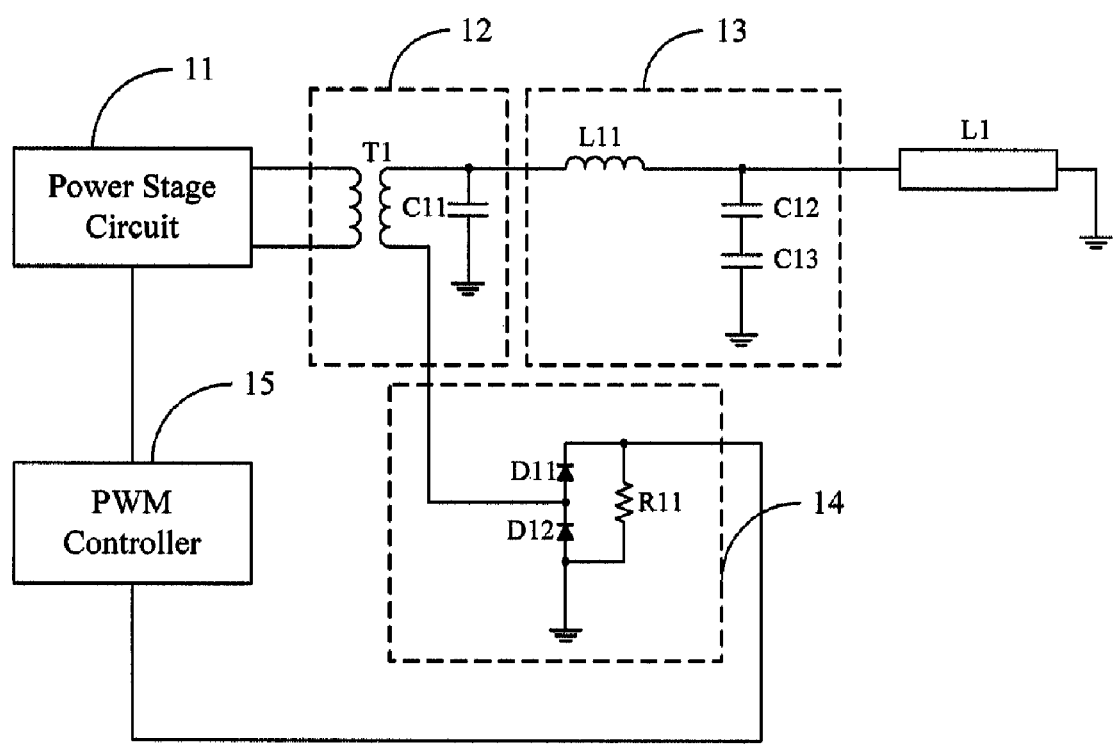
FIG. 3 is a conventional driving device.

FIG. 2 is a driving device of another exemplary embodiment of the present invention. The driving device is substantially the same as that of FIG. 1, except that the driving device of FIG. 3 for driving a plurality of lamps L3$n$ ($n=1, 2, 3, \ldots, n$) includes a plurality of resonance circuits 33$n$ ($n=1, 2, 3, \ldots, n$). The resonance circuits 33$n$ ($n=1, 2, 3, \ldots, n$) are respectively connected to the transformer circuit 32. Structure of the transformer circuit 32 and the resonances circuit 33$n$ ($n=1, 2, 3, \ldots, n$) are the same as those of the transformer circuit 22 and the resonance circuit 23 of FIG. 2. Connections between the transformer circuit 32 and the resonance circuits 33$n$ ($n=1, 2, 3, \ldots, n$) are the same as those of the transformer circuit 22 and the resonance circuit 23. Therefore, description is omitted. In the exemplary embodiment, the resonance circuits 33$n$ ($n=1, 2, 3, \ldots, n$) are respectively connected to corresponding lamps L3$n$ ($n=1, 2, 3, \ldots, n$), for driving the lamps L3$n$ ($n=1, 2, 3, \ldots, n$).

In the present invention, the capacitors of the transformer circuit and the resonance circuits are directly connected between the high voltage terminal and the low voltage terminal of the secondary winding of the transformer, so that stray current is not generated between the transformer circuit, the resonance circuit, and a shell of an LCD panel. Therefore, the current feedback is relatively precise.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A driving device for driving at least one lamp, the driving device comprising:
    a power stage circuit for converting a received direct current (DC) signal to an alternating current (AC) signal;
    a transformer circuit connected to the power stage circuit, for stepping up the AC signal, the transformer circuit comprising:
    a transformer having a primary winding and a secondary winding, the transformer comprising a leakage inductor; and
    a capacitor connected between a high voltage terminal and a low voltage terminal of the secondary winding of the transformer for resonance with the leakage inductor of the transformer;
    at least one resonance circuit connected between the high voltage terminal and the low voltage terminal of the secondary winding of the transformer of the transformer circuit, for converting the stepped up AC signal to an appropriate signal to drive the at least one lamp; and
    a pulse width modulation (PWM) controller connected to the power stage circuit, for controlling output of the power stage circuit;
    wherein the at least one resonance circuit and the capacitor of the transformer circuit are in a parallel connective relationship between the high voltage terminal and the low voltage terminal of the secondary winding of the transformer.

2. The driving device as claimed in claim 1, wherein the resonance circuit comprises:
    an inductor connected between the high voltage terminal of the secondary winding of the transformer and the at least one lamp; and
    a first resonance capacitor connected between the low voltage terminal of the secondary winding of the transformer and the at least one lamp.

3. The driving device as claimed in claim 2, wherein the resonance circuit comprises a second resonance capacitor connected between the first resonance capacitor and the low voltage terminal of the secondary winding of the transformer.

4. The driving device as claimed in claim 2, wherein the first resonance capacitor is an embedded capacitor.

5. The driving device as claimed in claim 1, further comprising a feedback circuit connected between the transformer circuit and the PWM controller, for providing a feedback signal of current flowing through the at least one lamp to the PWM controller, the feedback circuit comprising:
    a first filter circuit for filtering noise of the feedback signal.

6. The driving device as claimed in claim 5, wherein the first filter circuit comprises a first filter capacitor connected between the low voltage terminal of the secondary winding of the transformer and ground.

7. The driving device as claimed in claim 5, wherein the feedback circuit comprises a second filter circuit, also for filtering noise of the feedback signal, the second filter circuit comprising a second filter capacitor and a resistor connected with the second filter capacitor in series between the low voltage terminal of the secondary winding of the transformer and ground.

8. The driving device as claimed in claim 5, wherein the feedback circuit comprises:
    a first diode, wherein an anode of the first diode is grounded, and a cathode of the first diode is connected to the low voltage terminal of the secondary winding of the transformer;
    a second diode, wherein an anode of the second diode is connected the cathode of the first diode, and a cathode of the second diode is electrically connected the PWM controller; and
    a resistor connected between the anode of the first diode and the cathode of the second diode.

9. The driving device as claimed in claim 1, wherein the resonance circuit is connected to the at least one lamp.

10. The driving device as claimed in claim 1, wherein the resonance circuit is electrically connectable between the capacitor of the transformer circuit and a selective one of the at least one lamp.

11. A driving device for driving at least one lamp, the driving device comprising:
    a power stage circuit for converting direct current (DC) signals input into said power stage circuit to alternating current (AC) signals for output;
    a transformer circuit electrically connectable with said power stage circuit for stepping up said AC signals, said transformer circuit comprising a transformer comprising a leakage inductor and defining a high voltage terminal to electrically connect with at least one lamp to be drivable by said driving device, and a low voltage terminal, a capacitor electrically connectable between said high voltage terminal and said low voltage terminal for resonance with said leakage inductor;

at least one resonance circuit electrically connectable between said transformer circuit and a selective one of said at least one lamp;

a feedback circuit electrically connectable with said low voltage terminal to retrieve current signals through said at least one lamp; and a pulse width modulation (PWM) controller electrically connectable between said power stage circuit and said feedback circuit for controlling output of said power stage circuit based on said retrieved current signals from said feedback circuit;

wherein said at least one resonance circuit and said capacitor of said transformer circuit are in a parallel connective relationship between said high voltage terminal and said low voltage terminal of said transformer.

12. The driving device as claimed in claim 11, wherein said at least one resonance circuit comprises at least one capacitor electrically connectable between said high voltage terminal and said low voltage terminal of said transformer.

13. The driving device as claimed in claim 11, wherein said at least one resonance circuit is electrically connectable between said capacitor of said transformer circuit and a selective one of said at least one lamp.

14. A display comprising:

at least one lamp installable in said display device to illuminate in said display device; and a driving device electrically connectable with said at least one lamp in said display device to power said at least one lamp, said driving device comprising:

a transformer to accept input power signals for stepping up said power signals, said transformer defining a high voltage terminal to electrically connect with said at least one lamp, and a lower voltage terminal for generating current signals through said at least one lamp in order to feedback said current signals for electrical current balance by means of controlling said input power signals;

a capacitor electrically connectable between said high voltage terminal and said low voltage terminal; and at least one resonance circuit electrically connectable between said capacitor and a selective one of said at least one lamp, for converting the stepped up power signals to appropriate signals to drive the at least one lamp.

15. The display as claimed in claim 14, wherein said at least one resonance circuit and said capacitor of said driving device are in a parallel connective relationship between said high voltage terminal and said low voltage terminal of said transformer.

\* \* \* \* \*